United States Patent
Thomas

(10) Patent No.: US 7,594,193 B2
(45) Date of Patent: Sep. 22, 2009

(54) VISUAL INDICATION OF USER ROLE IN AN ADDRESS BAR

(75) Inventor: Kasman E. Thomas, Wilton, CT (US)

(73) Assignee: Novell, Inc., Provo, UT (US)

( * ) Notice: Subject to any disclaimer, the term of this patent is extended or adjusted under 35 U.S.C. 154(b) by 374 days.

(21) Appl. No.: 11/703,043

(22) Filed: Feb. 6, 2007

(65) Prior Publication Data

US 2008/0189654 A1   Aug. 7, 2008

(51) Int. Cl.
*G06F 3/00* (2006.01)
(52) U.S. Cl. .................. 715/835; 715/765; 715/738
(58) Field of Classification Search .......... 715/711, 715/733, 738, 741, 764, 765, 835, 846, 862, 715/863
See application file for complete search history.

(56) References Cited

U.S. PATENT DOCUMENTS

| | | | |
|---|---|---|---|
| 6,202,066 | B1 | 3/2001 | Barkley et al. |
| 6,452,614 | B1 * | 9/2002 | King et al. ................ 715/775 |
| 6,732,100 | B1 | 5/2004 | Brodersen et al. |
| 7,089,243 | B1 | 8/2006 | Zhang |
| 2006/0218391 | A1 | 9/2006 | Glazer et al. |
| 2006/0218403 | A1 | 9/2006 | Sauve et al. |
| 2007/0234218 | A1 * | 10/2007 | Baschy ..................... 715/741 |
| 2007/0282947 | A1 * | 12/2007 | Hupfer et al. ............. 709/204 |

OTHER PUBLICATIONS

Novell, Inc. "Case Study," www.novell.com, Jan. 12, 2007, 6 pps.
Wikipedia, "Favicon," en.wikipedia.org/wiki/Favicon, Jan. 12, 2007, 3 pps.
Wikipedia, "URL Bar," en.wikipedia.org/wiki/Address_bar, Jan. 17, 2007, 2 pps.

* cited by examiner

*Primary Examiner*—X. L Bautista
(74) *Attorney, Agent, or Firm*—King & Schickli, PLLC

(57) ABSTRACT

Apparatus, methods and computer program products relate to icons in an address bar of a browser indicative of roles of users as they visit web sites. In this manner, users (with many roles, such as in the context of an employer's business) are visually cued to remind them of their role at the web sites, often because web sites have different functionality according to different roles. Various features include icon forms suggesting roles as employees, managers, administrators, anonymous users, etc. Upon mousing-over icons, tool tips are obtainable regarding a status of the role of the user. Menus of multiple icons are also available for the many roles of the user. Upon selection of one the icons of the menu, the selected icon appears in the address bar upon the user visiting the website in their new role. Altering the display of the icon exists to show different role status.

26 Claims, 12 Drawing Sheets

User is in Employee role, with expired credentials

Selecting a new role from flyout menu

VISUAL INDICATION OF USER ROLE IN AN ADDRESS BAR

FIELD OF THE INVENTION

Generally, the present invention relates to computing environments having browsers with address bars (alternatively: URL bars, location bars, address fields, etc.). Particularly, it relates to usage of icons with the address bar, especially icons indicating a user's role as they visit web sites with the browser. Various features include icons with alternate states per user status, tool tips upon mouse-over gestures, and menus for user selection, to name a few.

BACKGROUND OF THE INVENTION

Icons have been known for some time in association with address bars of browsers. In a typical application, an icon appears in an address bar in the form of a padlock, key, or other symbol suggesting security, whenever the visited website is configured as a secure website, such as with an https designation. In another application, icons appear as a proprietary logo, a trademark, a company brand, or as some other symbol suggesting the company of the website. For instance, the Yahoo!, Inc., website hosted at the URL (uniform resource locator) http:www.yahoo.com, for example, causes the display of an icon "Y!" in the address bar of the browser that is representative or identical to one of Yahoo!, Inc.'s trademarks. Also known in the art as "Favicons," meaning favorite icons, the icons can also appear as a result of the designer of the website or by manipulation by users. They can further appear as icons in drop-down menus corresponding to bookmarks of "favorite" web pages, thereby providing users with visual cues for easy spotting when navigating the menus. They can even appear in tabbed document interfaces.

Regardless of application, all icons presently provide a visual indication relating exclusively to the host website. While some have functionality in the form of users being able to drop and drag them, into book-marked folders or "favorites" to create a link to the website (or particular web page), or "click" them to learn additional information, such as clicking on a padlock icon to learn about a secure website, none have additional functionality. None also have anything to do with the user visiting the website.

In that users often have many "roles," such as in the context of an identity-managed computing environment in an employer's business (e.g., manager, employee, director, system administrator, etc.), users often need or desire to act in those roles when visiting various company resources, accessible regularly via a web browser. For instance, a user in the role of manager may need to access company-based computing applications to learn or investigate the financial pay information and benefits for direct-reporting employees. The same user may also have need to investigate the same application when in the role of employee to learn or investigate their own financial pay information and benefits. For at least this reason, the same user has multiple roles and multiple needs of visiting a common application. However, it is important for the user to understand what role they are in because inconvenience results if applications are visited when in the wrong role. For instance, users need to re-verify credentials or re-log-in, such as with username and password, to visit the application or website in a role different than their existing role, and this wastes time.

Accordingly, there is need in the art of user roles to readily cue or remind users of their present role. There is further need to do so in the context of visiting web sites or applications via browsers. To the extent icons are employed, functionality is important. It is also important that users have convenient mechanisms to change roles on the fly. In that many users already own and/or use a browser with an address bar for visiting web sites, it is further desirable to convert existing browsers to the type meeting the needs outlined above. Naturally, any improvements along such lines should further contemplate good engineering practices, such as relative inexpensiveness, stability, ease of implementation, low complexity, flexibility, etc.

SUMMARY OF THE INVENTION

The above-mentioned and other problems become solved by applying the principles and teachings associated with the hereinafter-described visual indication of user role in an address bar. In a basic sense, users log onto a computing device in a specific role and visit web sites or applications (hereafter collectively website(s)) in that role by way of a browser. The icons are not, however, indicative of the website being visited and focus on the user. This, as will be seen below, adds robustness heretofore unavailable.

In various embodiments, icons have forms suggestive of user roles as an employee, a manager, an administrator, an anonymous user, etc. Upon mousing-over the icon, tool tips are obtainable regarding a status of the role of the user. Menus of multiple icons are also available for the many roles of the user. Upon selection of one the icons of a menu, the selected icon appears in the address bar upon the user visiting the website in their new role. Altering the display of the icon to show different user-role status is also contemplated. Regardless of which icon is selected or why, its display reflects the role of the logged-in user at that moment, in that particular target system. For example, if the user logs in as an ordinary employee, the employee icons shows in the address bar. If the user navigates to the manager role, the icon changes to the manager icon. If the user has appropriate rights and is able to click into a page that allows them to act as an administrator, the icon changes to the administrator. And so forth.

Computer program products to retrofit existing browsers or provide a fully operational browser, for example, are available as a download or on a computer-readable medium for installation on a computing device of a user to support the visual indication of a role of the user.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for functional, visual indication of a user role in or near an address bar of a browser is hereinafter described.

Figure 1:
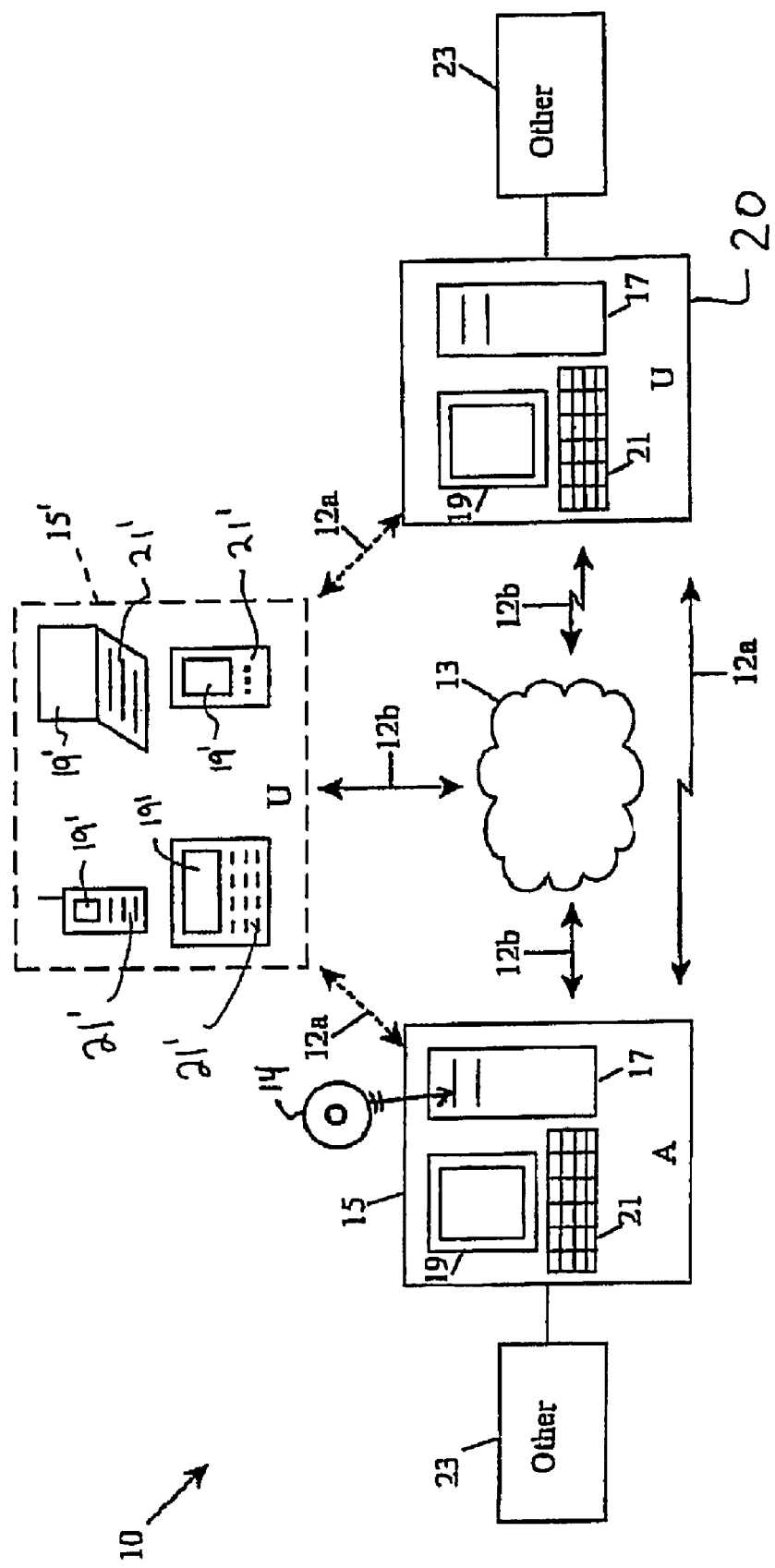
FIG. 1 is a diagrammatic view in accordance with the present invention of a representative computing environment for providing functional, visual indication of a user role in or near an address bar of a browser.

With reference to FIG. 1, a representative environment 10 for visually indicating user role in or near an address bar of a browser consists of one or more computing devices 15 or 15' available per each user, especially as an installed application of executable code on a computing device remote from a computing device 20 hosting one or more websites. In a traditional sense, an exemplary computing device exemplifies a stand alone server 17, such as a grid or blade server. Alternatively, an exemplary computing device includes a general or special purpose computing device in the form of a conventional fixed or mobile computer 17 having an attendant viewing screen 19 (e.g., monitor) or 19' and user input mechanism 21 or 21', including a pointer. The computer internally includes a processing unit for a resident operating system, such as DOS, WINDOWS, MACINTOSH, VISTA, UNIX and LINUX, to name a few, a memory, and a bus that couples various internal and external units, e.g., other 23, to one another. Representative other items 23 include, but are not limited to, PDA's, cameras, scanners, printers, microphones, joy sticks, game pads, satellite dishes, hand-held devices, consumer electronics, minicomputers, computer clusters, main frame computers, a message queue, a peer machine, a broadcast antenna, a web server, an AJAX client, a grid-computing node, a peer, a virtual machine, a web service endpoint, a cellular phone or palm device, or the like. The other items may also be stand alone computing devices 15' in the environment 10 or the computing device itself, upon which the browser and address bar of the invention is installed.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., software, as part of computer program products on readable media, e.g., disk 14 for insertion in a drive of computer 17 or available as a download or reside in hardware, firmware or combinations in any or all of the depicted devices 15 or 15'.

When described in the context of computer program products, it is denoted that items thereof, such as modules, routines, programs, objects, components, data structures, etc., perform particular tasks or implement particular abstract data types within various structures of the computing system which cause a certain function or group of functions. In form, the computer program product can be any available media, such as RAM, ROM, EEPROM, CD-ROM, DVD, or other optical disk storage devices, magnetic disk storage devices, floppy disks, or any other medium which can be used to store the items thereof and which can be assessed in the environment.

In network, the computing device 15 or 15' communicates with one or more other devices 20 via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given indistinctly as element 13. In this regard, other contemplated items include servers, routers, peer devices, modems, T1 lines, satellites, microwave relays or the like. The connections may also be local area networks (LAN) and/or wide area networks (WAN) that are presented by way of example and not limitation. The topology is also any of a variety, such as ring, star, bridged, cascaded, meshed, or other known or hereinafter invented arrangement.

Figure 2:
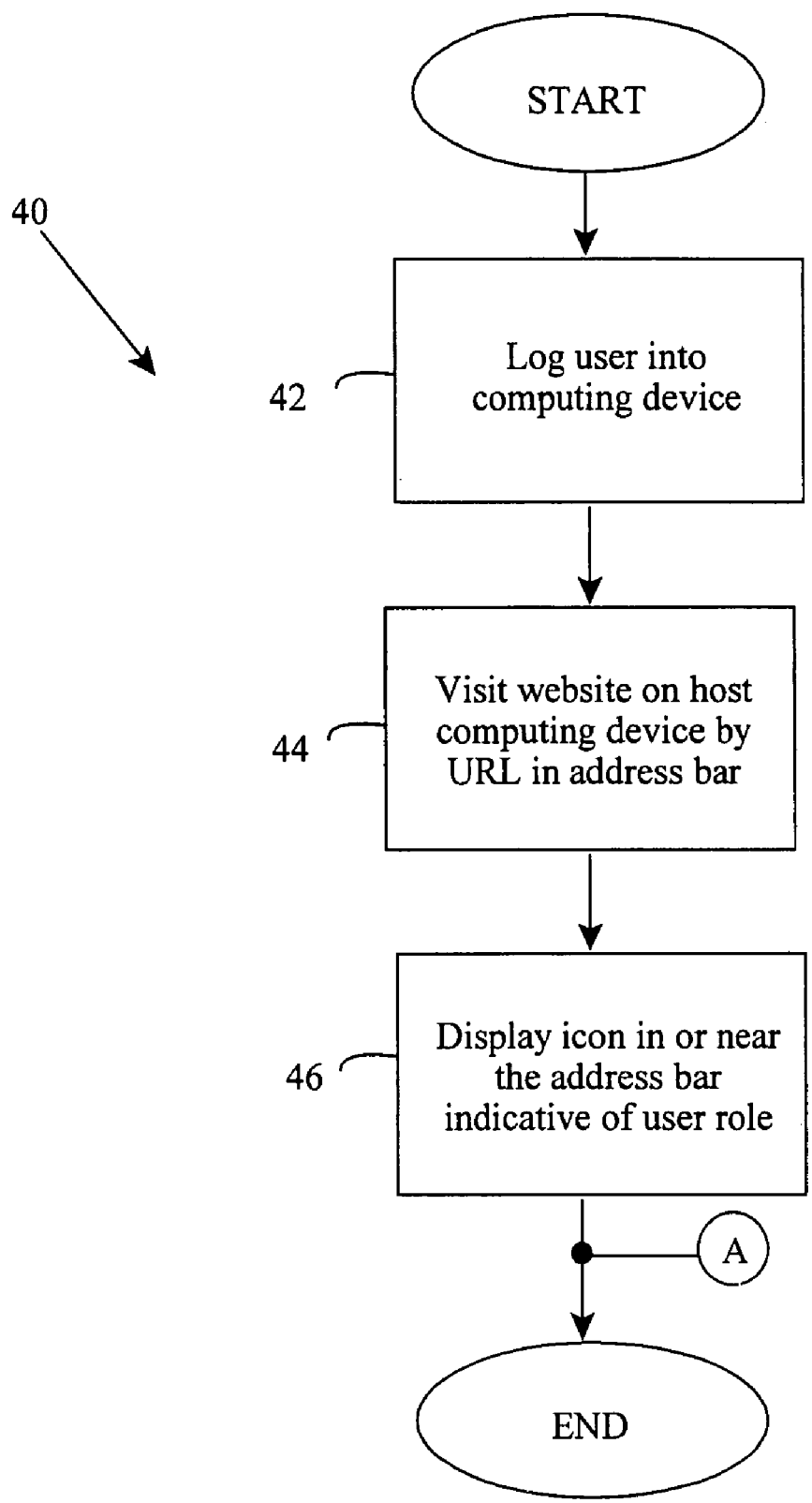
FIG. 2 is a flow chart in accordance with the present invention of a high-level organization for visually indicating a user role in or near an address bar.

With reference to FIG. 2, a high-level organization for providing visual indication of a user role relative to an address bar of a browser is given generally as element 40. In a first step (step 42), a user logs onto a computing device (e.g., element 15 or 15', FIG. 1). As is typical, this may consist of a user filing out and submitting forms, such as those associated with log-on/log-in screens having usernames and passwords, or may occur by way of simple operation of the computing device. That is, computing devices themselves are sometimes assigned to users in particular roles in organizations and the mere operation of the computer is enough to recognize the user, in their role, as being logged-on. In this regard, it is also contemplated that logging-on exists in a computing environment, such as in FIG. 1, whereby users work in different roles inside an organization or entity, such as a corporation, having an innerweb, an intranet, etc., behind a corporate firewall. Upon logging in, a pallette of applications are then available to the users in their role.

For instance, Novell, Inc. (the Assignee of the present invention), provides its employees an innerweb accessible by an employee portal offering secure, personalized access from anywhere in the world. Upon logging-in, the users see and have access to a personalized web site which includes various applications and resources based on their role in the corporation. As described at http://www.novell.com/innerweb/, for example, a user in the role of salesperson has access to comprehensive views and customer information, as well as opportunity and contract management tools. This personalization then prevents employees from having to wade through screens of information to find that which is useful to them in their role. As before, however, users may have multiple roles and therefore have need of knowing their role, such as upon visual cuing, to which the instant invention is dedicated.

In a second step (step 44), the user visits a website on a host computing device (e.g., 20, FIG. 1) in their role and does so by way of a URL in an address bar of a browser, which is also typical.

At step 46, an icon in or near the address bar of the browser is then displayed that indicates the role of the user as they visit the website. In this manner, users (with many roles, such as in the context of an employer's business) are visually cued to remind them of their role at the websites visited, especially since the websites often have different functionality according to different roles. Heretofore, this has never been done. Also, it is anticipated that the icon will consist of a word(s), letter(s), symbol(s), word(s) and symbol(s), etc., including various colors or not, directly indicative of the role of the user or suggestive of same. In this regard, a near endless variety of icons are available for use and skilled artisans will readily imagine examples. A few representative icons will be also shown below, but the invention is not so limited.

Figure 6:
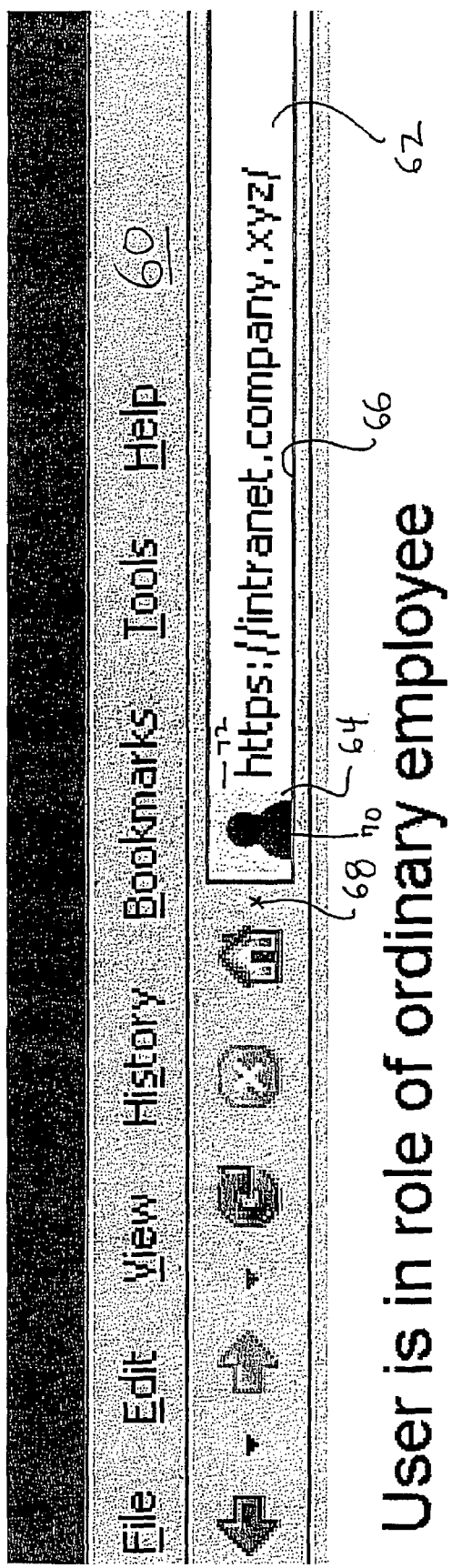
FIG. 6 is a screen shot in accordance with the present invention of a representative visual indication in or near an address bar of a user in an ordinary employee role.

With reference to FIG. 6, a browser 60 includes an address bar 62 for receipt of a URL (in this instance, https://intranet-.company.xyz/) for the user to visit the website hosted at the URL. An icon indicative of the user role appears generically as element 64. It exists in the space of the address bar, such as within border 66, or may be near the address bar, such as at a location given generically as location 68. If within the address bar, it can appear either to the left (as shown) or right of the URL, but may also be above, below or within it, depending upon space constraints. In form 70, it appears as a human shape, in this example, in a boundary 72 corresponding to a user in a role of an ordinary employee. It does not, however, indicate the website being visited, but alternate embodiments may contemplate such an icon. That is, an icon may indicate the role of the user exclusively, the role of the user along with indicia indicative of the host, or multiple icons, such as a role-based icon together with a Favicon, or other.

Figure 8:
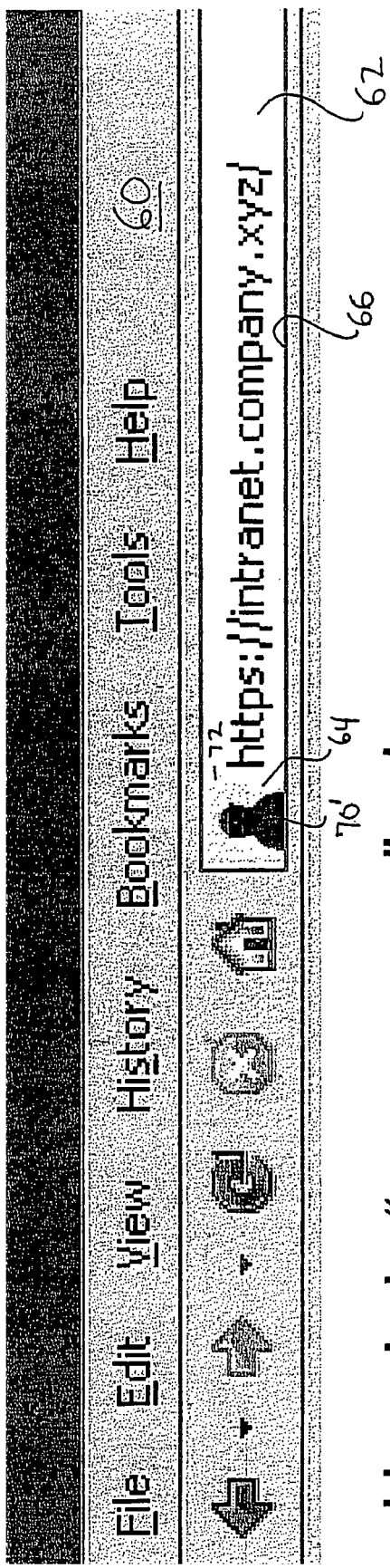
FIG. 8 is a screen shot in accordance with the present invention of a representative visual indication in or near an address bar of a user in an anonymous role.
Figure 9:
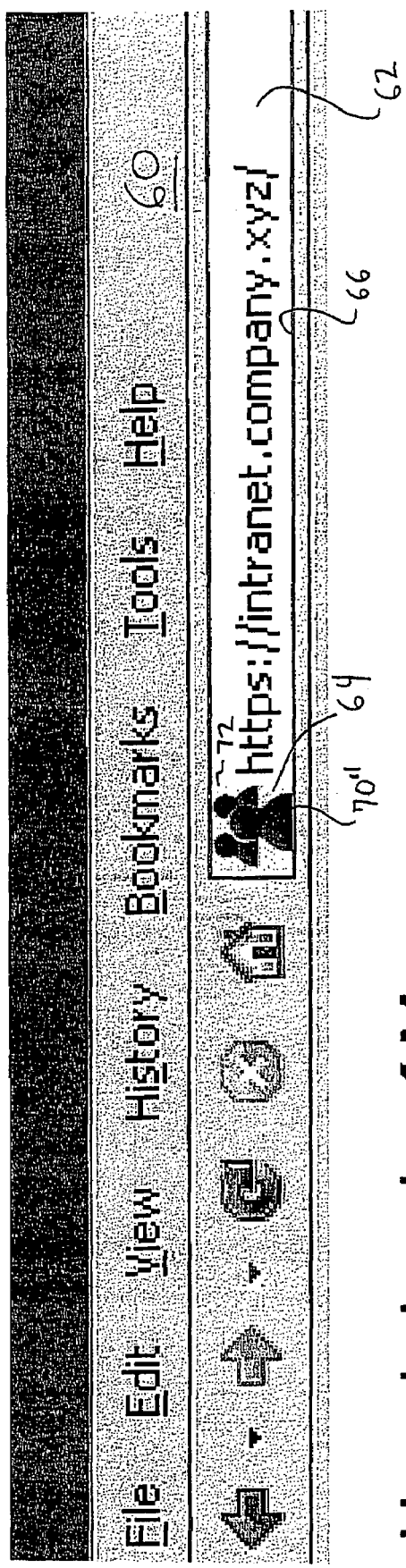
FIG. 9 is a screen shot in accordance with the present invention of a representative visual indication in or near an address bar of a user in a manager role.
Figure 10:
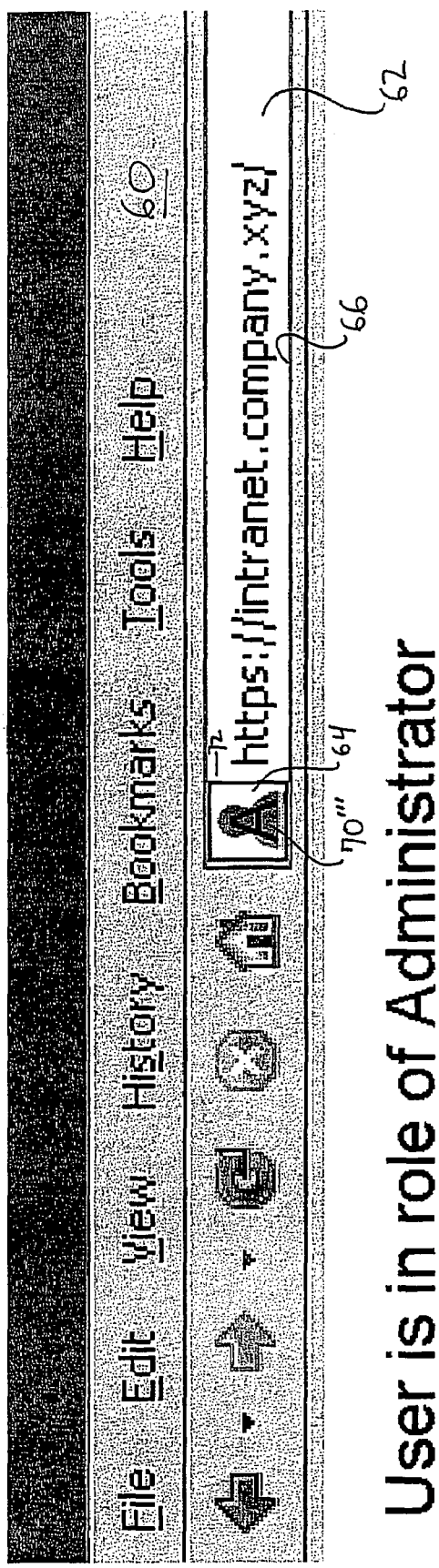
FIG. 10 is a screen shot in accordance with the present invention of a representative visual indication in or near an address bar of a user in an administrator role.

With reference to FIGS. 8-10, alternate embodiments of the form of the icon consist of the user in different roles in which they may have credentials for and in which they visit the website hosted at the URL. For instance, FIG. 8 shows a user role as that of an anonymous user 70' (a human form in sunglasses); FIG. 9 shows the user role as that of a manager 70" (a human form with other human forms indicating reporting employees, for example); while FIG. 10 shows the user role as that of an administrator 70''' (a human form with a letter A laid thereon). Of course, many examples are possible and this is just representative.

Figure 3:
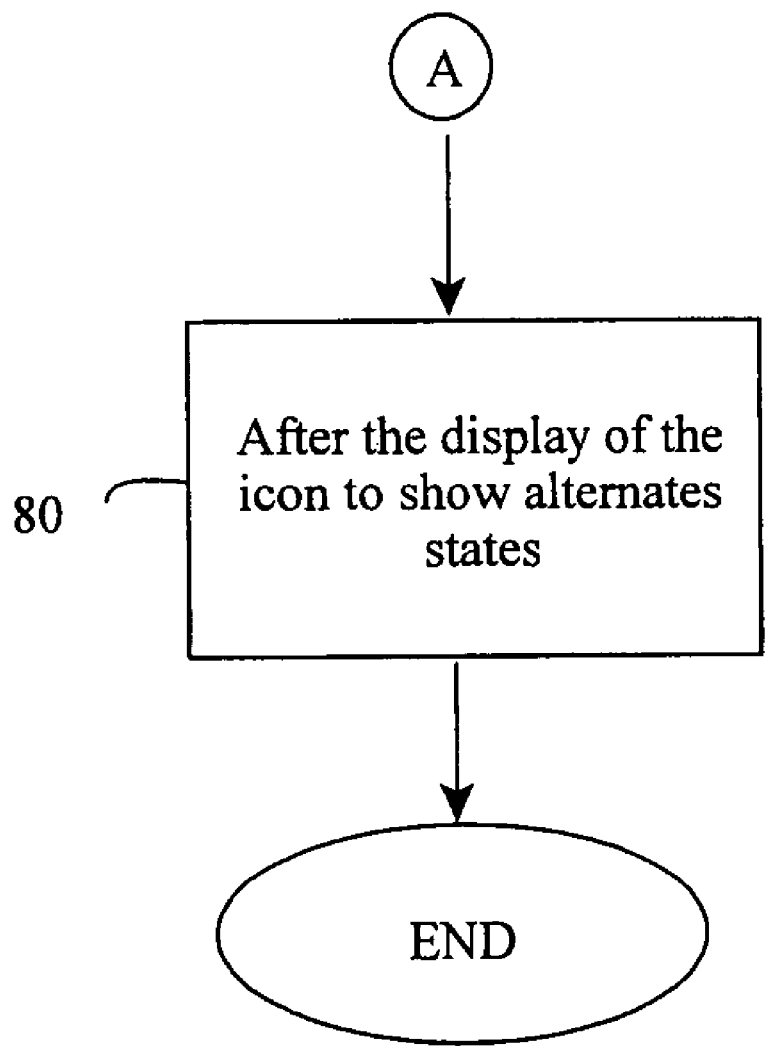
FIGS. 3-5 are flow charts in accordance with the present invention of alternate embodiments for visually indicating a user role in or near an address bar.
Figure 7A:
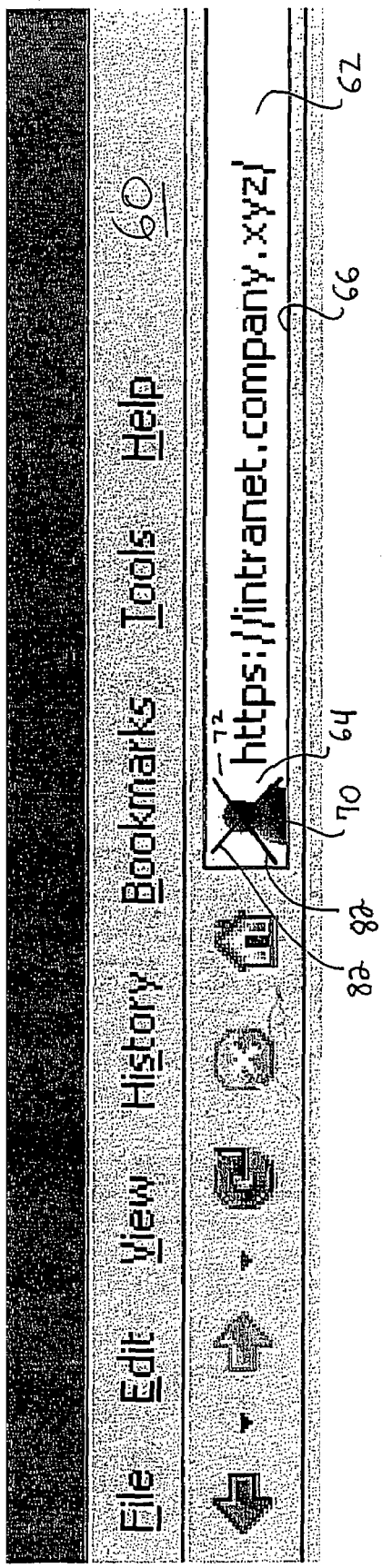
FIG. 7A is a screen shot in accordance with the present invention of a representative visual indication in or near address bar of a user in an ordinary employee role having expired credentials.

With reference to FIG. 3, an optional embodiment of providing a visual indication of user icons consists of altering the display of the icon to show one or more alternate states (step 80). In this regard, it is appreciated that a status of a role of a user may be active or inactive (or imminently about to change status) during a time period when a particularly website is visited. For instance, some websites may be of a confidential nature, such as those related to personal finances and benefits, and if inactivity is observed (such as no movement of a mouse or no typing on a keyboard) it is prudent to make the website inactive for users so that passers by of the computing device are unable to use the functionality of the website if the web page is somehow still loaded and the true user is elsewhere. In such a case, the display of the icon can alter between color to gray, for instance, alter to a "dimmed-out" appearance, or alter from an icon with cancellation marks, 82 as seen in FIG. 7A (as compared to FIG. 6 having no cancellation marks). To refresh the activity, and alter the icon back to its active state (e.g., FIG. 6) it is contemplated that users will simply re-verify their credentials, such as by logging in or other.

Figure 4:
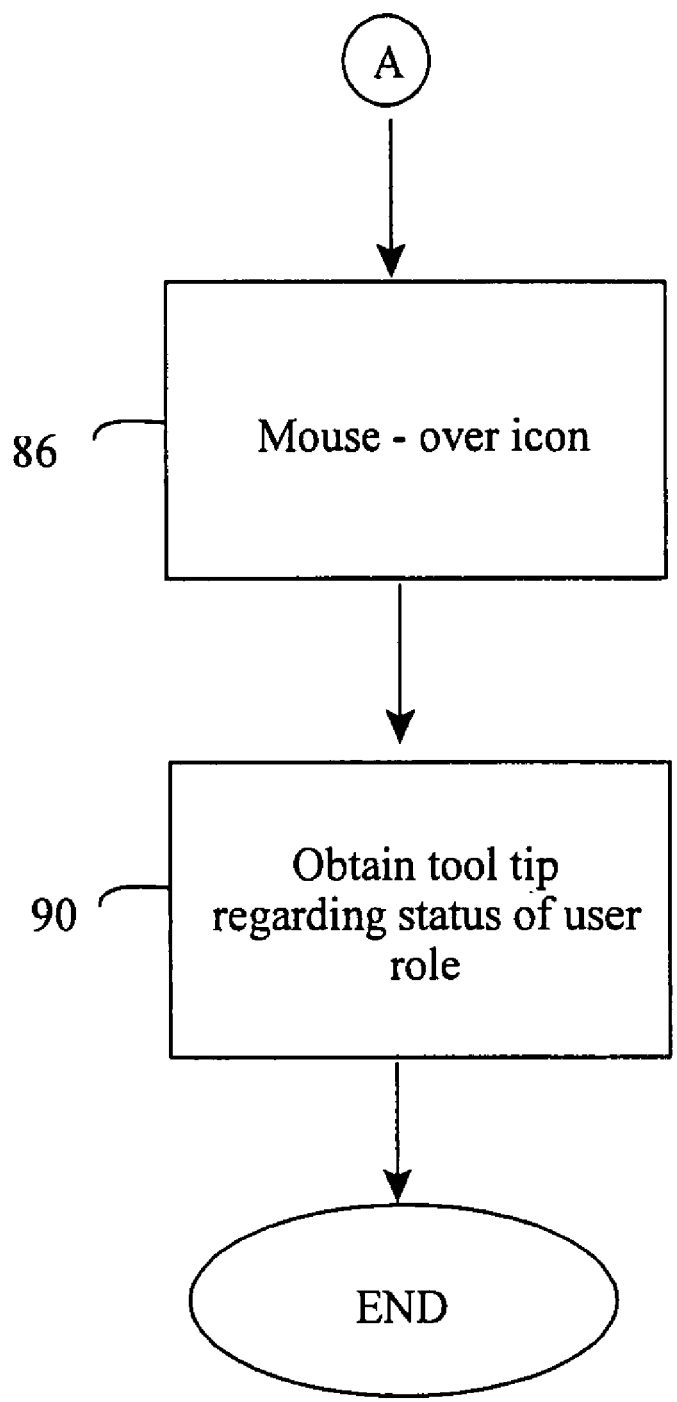
Figure 7B:
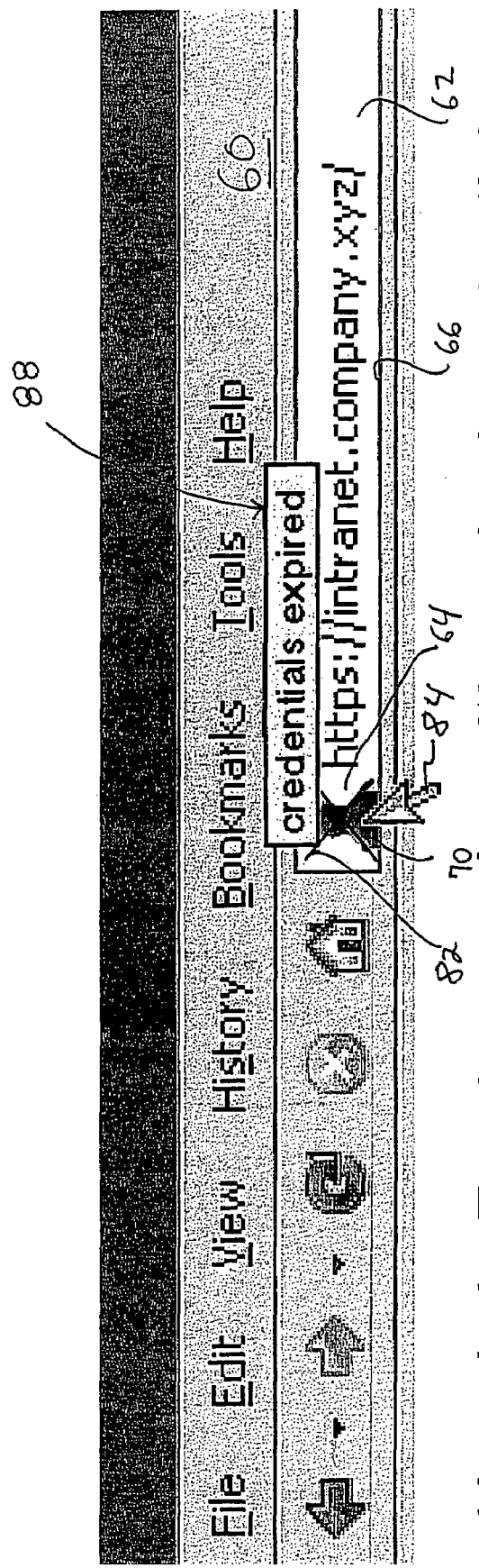
FIG. 7B is a screen shot in accordance with the present invention of a representative visual indication in or near an address bar of a user in an ordinary employee role having expired credentials with a mouse-over tool tip.

Since users may be unfamiliar with the meaning of cancellation marks on an icon, or change in icon status from color to gray, or the like, FIGS. 4 and 7B add functionality in the form of a mouse-over gesture (step 86 and pointer 84 within a periphery of the icon 64) to provide the user with a tool tip 88 regarding user status (step 90). As seen, the tool tip informs the user that their credentials have expired. Other embodiments inform the user that their password has expired or will expire imminently. Of course, many tool tips are contemplated and this figure is only representative. Skilled artisans will be able to contemplate others.

Figure 5:
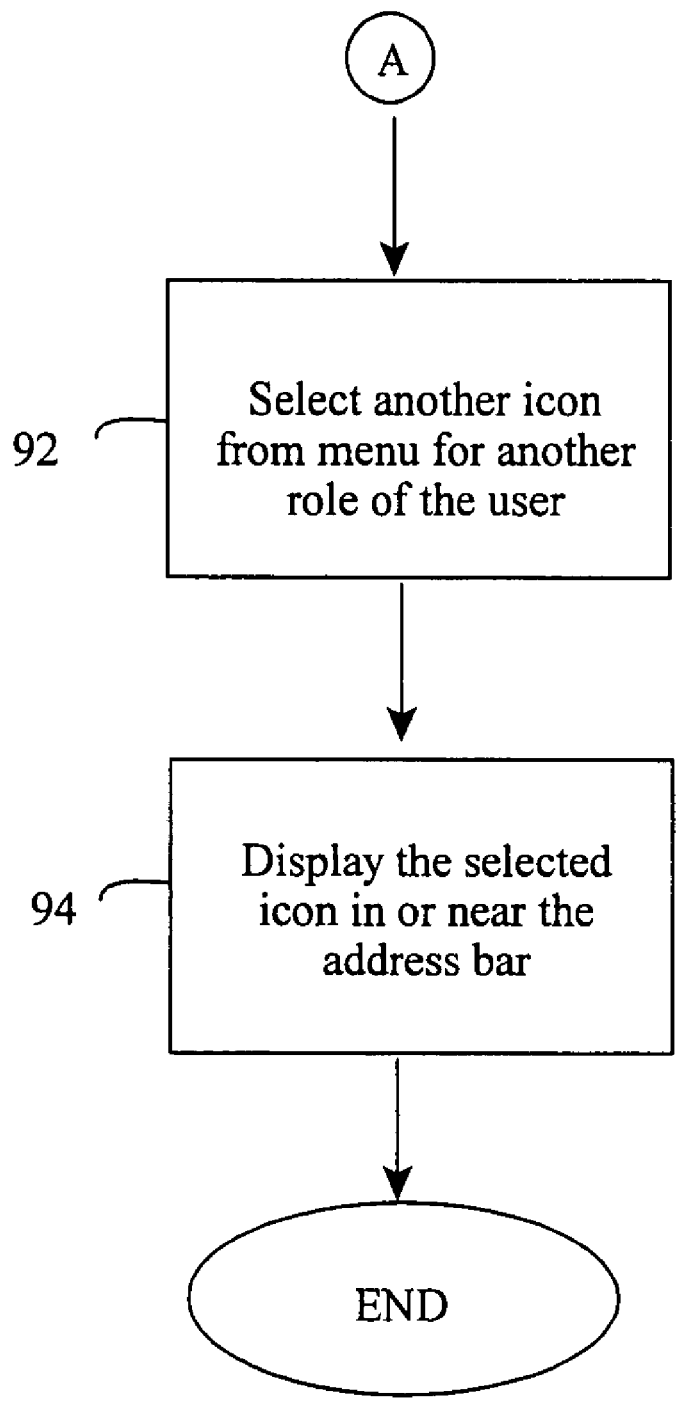

With reference to FIG. 5, another optional embodiment of the invention consists of users being able to select between various roles they can assume based on their identity. In this manner, they can transition on-the-fly between their various roles (and refresh the website page automatically) or provide an initial or subsequent log-in. For instance, a user can select an icon from a menu of icons according to whatever role they desire to transition to or log-on as, step 92. Upon this occurring, the selected icon is displayed in or near the address bar (step 94), as with the previously shown icons. Users then need not log-out and re-enter password and username information to switch roles. As imagined, this then provides great convenience to the user.

Figure 11:
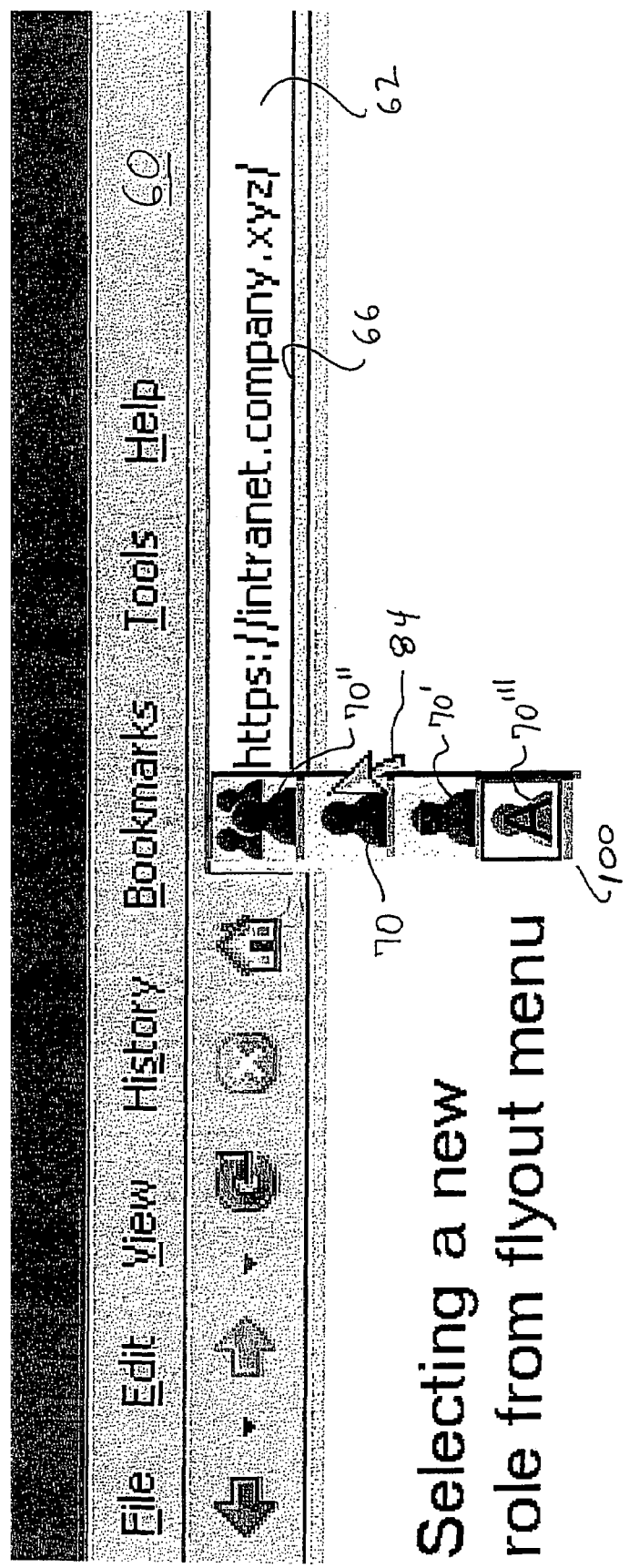
FIG. 11 is a screen shot in accordance with the present invention of a representative visual indication in or near an address bar of a menu of icons for users to select one of many roles.

With reference to FIG. 11, this icon functionality is seen in the previously described icons, for various user roles, and in the form of a drop-down or flyout menu of icons 100 that is selectable by the user with a pointer 84, for example. During use, the user selects the icon desired, icon 70 in this instance, and the icon becomes displayed in or near the address bar 62 upon the visiting of the website at the URL. Thus, the user can change roles on the fly. Other menus, however, could be provided as part of a selectable button or in drop-down menus as part of the browser, as a tray or floating palette, or some other suitable UI widget. Naturally, those of skill in the art will be able to contemplate other scenarios.

In a representative software implementation, especially for a corporate intranet scenario, the foregoing-described role-based icons could be stored in a central repository. A "mediator" process (which could involve a role manager) could fetch icons from the repository in response to requests by external entities. Web applications (external entities) could explicitly specify the use of the icon in a web page using traditional Favicon mechanisms, so for example, the following markup would be placed in the<head>section of an HTML page:

<link rel="shortcut icon"href="http://rolicon.server/request?rolicon.ico" type="image/x-icon">

During use, the markup could be generated by the web application at runtime, hard-coded into the page in static fashion, or inserted by an intercepting process (such as a servlet filter) dynamically, etc. The icon request is contained in the href attribute value. The href attribute would have a different value for an administrator role page versus an anonymous-user page versus an error page or an access-denied page, etc., so that the correct icon gets fetched and displayed to the user. The actual value of this attribute would reflect the final outcome of whatever role calculation(s) took place before the call came to generate the page.

In the above scenario, the icons are themselves under access control, so the user (in theory) can never see an icon they are not authorized to see. However, the system is failsoft in that failure to obtain an icon in no way limits the ability of the user to go on using the web application if they have logged in successfully. All that happens is that they do not see an icon in the address bar.

In other embodiments, icons indicative of user role can be optionally used by software on the client to present a UI to the user for choosing log-on personas. The software could be implemented as a browser plug-in. The implementation could be a combination of XUL and JavaScript on Firefox, or it could be a compiled plugin. It could be an AJAX application with logic distributed across client and server. It could be also implemented as a GreaseMonkey (e.g., http://en.wikipedia.org/wiki/Greasemonkey) script packaged in a secure JAR. In any of these cases, the implementation would be a straightforward task for any person skilled in the art.

Appreciating many other embodiments are possible, it should be appreciated the claims are simplistically written such that an "address bar" as part of a browser also includes any software that exposes a URL address bar, such as is done in OpenOffice.org Writer, file-system browsers, etc. Strictly speaking, icons need not be tied to URLs, either, since URNs and URIs are often used in "address bars," and there is no reason why they could not be juxtaposed against other kinds of locator strings as well (URLs, however, will be used in the claims to encompass all). So for example, current and future file-browsers, source-code browsers, directory browsers, and other non-web browsers could use this invention. Also, alternate embodiments contemplate visual and aural cues for icons, such as icon blinking or beeping, etc.) to indicate dynamic separation of duty (DSOD) related (or other) role conflicts.

Regardless of implementation, certain advantages of the invention over the prior art should now be readily apparent. For example, it is heretofore unknown to use icons indicative of the role of the user, and/or avoid use of icons reflective of the host computing device. In this manner, icons can be used in role-selection user interfaces (to aid a user in choosing a persona before logging onto a given system). They can also give realtime feedback to the user about his or her role at a place in a given application. Under this scenario, a user logs into a target system with a given set of credentials and a role-appropriate icon appears automatically in or near the address bar of the client application (Firefox browser, Internet Explorer (IE) browser, etc.), next to the URL. In this way, the user is provided with immediate visual feedback as to his or her role state. Further, the icons and their use described above: enable an unsophisticated user to discover role information about themself, quickly and naturally, via a GUI that associates a role symbol with a URL at the time the URL is being used; provide a way to reduce Help Desk calls in identity-managed environments (in that users know their role and need not inquire of the Help Desk); enable a user to select from available roles using a point-and-click (or other simple) UI gesture, in preparation for accessing a system, so that the client software can prefetch any resources (e.g., credentials stored in a keystore, cookie, etc.) that might be needed to access the system; provide a visual means of alerting a user to the expiration status of a particular set of credentials associated with a given role; and provide a UI mechanism by which a user can determine relationships between roles "at a glance." Of course, these are only a few of the many advantages of the invention and skilled artisans will immediately recognize others.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. A computing device having a browser for visiting web sites, the browser having a functional visual indicator, comprising: an icon in or near an address bar of the browser having a plurality of forms indicative of a plurality of roles of a single user at a time when the user visits the web sites in one of said roles.

2. The computer device of claim 1, wherein the icon has at least one alternate state showing a status of the role of the user.

3. The computer device of claim 1, wherein the form of the icon is one of an employee, a manager, an administrator and an anonymous user.

4. The computer device of claim 1, wherein the indicator further includes a tool tip upon a mouse-over gesture on the icon.

5. The computer device of claim 1, wherein the icon exists in a menu of other icons for the plurality of roles of the user.

6. A system for visually indicating a role of a user in a computing environment, comprising:
   a computing device having a viewing screen;
   an address bar viewable on the viewing screen for receipt of a URL of a website; and
   an icon viewable in or near the address bar having a form indicative of the role of the user as the user visits a web site having the URL, the form indicative of the role of the user being changeable to an alternate form for a same user.

7. The system of claim 6, wherein the icon has at least one alternate state showing a status of the role of the user.

8. The system of claim 6, wherein the form of the icon is one of an employee, a manager, an administrator and an anonymous user.

9. The system of claim 6, further including a tool tip upon a mouse-over gesture on the icon.

10. The system of claim 6, wherein the icon exists in a menu of other icons for other roles of the user.

11. The system of claim 6, wherein the address bar is viewable in a web browser on the viewing screen.

12. A system having a viewing screen and user input mechanisms, including a pointer, to visually indicate a user role in a computing environment, comprising:
   a web browser visually displayable on the viewing screen of a computing device in the computing environment;
   an address bar as part of the web browser for receipt of a URL to point at a website of a host computing device; and
   an icon in or near the address bar having a form indicative of the role of the user of the web browser upon visiting the website of the host computing device, the icon having no form indicative of the website of the host computing device.

13. The system of claim 12, wherein the icon has at least one alternate state showing a status of the role of the user.

14. The system of claim 12, further including a tool tip upon the pointer being moved on or over the icon.

15. The system of claim 12, wherein the icon exists in a menu of other icons for other roles of the user, the menu being extendable from the address bar.

16. A method of visually indicating a user role in a computing environment, comprising:
   logging a user onto a computing device of the computing environment, the computing device having a browser with an address bar visually displayable on a viewing screen of the computing device;
   from the computing device, visiting a website on a host computing device by way of a URL in the address bar of the browser; and
   displaying an icon in or near the address bar on the viewing screen, the icon having a first form indicative of a first role of the user as the user visits the website as obtained from the logging; and
   changing the first form to a second form indicative of a second role of the user as the user visits said website or an alternate website.

17. The method of claim 16, further including mousing-over the icon and obtaining a tool tip regarding a status of the role of the user.

18. The method of claim 16, further including selecting another icon for another role of the user.

19. The method of claim 18, further including visiting the website in the another role of the user and displaying the another icon in or near the address bar on the viewing screen.

20. The method of claim 19, wherein the visiting the website in the another role of the user further includes providing options to the user different than those provided to the user in the role.

21. The method of claim 16, further including altering the display of the icon to show at least one alternate state corresponding to a status of the role of the user.

22. The method of claim 16, wherein the displaying the icon in or near the address bar on the viewing screen does not include displaying a website-indicative icon.

23. A computer program product having a data structure on a computer-readable medium for installation on a computing device of a user to visually indicate a role of the user on a viewing screen of the computing device during a visit to a website of a host computing device, comprising:
   a first data field containing data representing one or more icons available per different user roles in which the user can visit the website; and
   a second data field functioning to cause display on the viewing screen of one icon of the one or more icons in or near an address bar of a browser upon the user visiting the website.

24. The computer program product of claim 23, further including a third data field functioning to cause display on the viewing screen of a tool tip regarding a status of the role of the user upon a mouse-over gesture on the icon.

25. The computer program product of claim 23, further including a third data field functioning to cause display on the viewing screen of another icon in or near the address bar corresponding to another role of the user upon the user visiting the website in the another role.

26. The computer program product of claim 23, further including a third data field functioning to alter the display of the icon to show at least one alternate state corresponding to a status of the role of the user.

\* \* \* \* \*